United States Patent
Nakashima et al.

(10) Patent No.: US 10,343,714 B2
(45) Date of Patent: Jul. 9, 2019

(54) SENSOR DEVICE

(71) Applicant: DENSO CORPORATION, Kariya, Aichi-pref. (JP)

(72) Inventors: Koutarou Nakashima, Kariya (JP); Shuji Kuramitsu, Kariya (JP); Kouichi Nakamura, Kariya (JP); Masaya Taki, Kariya (JP); Toshimitsu Sakai, Kariya (JP); Takaharu Kozawa, Kariya (JP); Katsuhiko Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 204 days.

(21) Appl. No.: 15/220,001

(22) Filed: Jul. 26, 2016

(65) Prior Publication Data

US 2017/0029015 A1 Feb. 2, 2017

(30) Foreign Application Priority Data

Jul. 28, 2015 (JP) .................. 2015-148583

(51) Int. Cl.
*B62D 5/04* (2006.01)
*G01L 3/10* (2006.01)
*G01L 25/00* (2006.01)

(52) U.S. Cl.
CPC ........... *B62D 5/049* (2013.01); *B62D 5/0412* (2013.01); *G01L 3/101* (2013.01); *G01L 3/104* (2013.01); *G01L 25/003* (2013.01)

(58) Field of Classification Search
CPC ......... G01L 3/10; G01L 13/101; G01L 3/109; G01L 25/0003; B62D 5/049; B62D 6/10
USPC ....... 73/1.09, 1.11, 114.15, 862.23, 862.193, 73/DIG. 3
See application file for complete search history.

(56) References Cited

U.S. PATENT DOCUMENTS

| 6,658,333 | B2 * | 12/2003 | Kawada | ............... | B62D 5/0484 180/443 |
| 2014/0102219 | A1 * | 4/2014 | Kuwahara | .............. | B62D 5/049 73/862.333 |
| 2014/0130612 | A1 * | 5/2014 | Takahashi | ................ | B62D 6/10 73/862.193 |

(Continued)

FOREIGN PATENT DOCUMENTS

| JP | S58-200482 A | 11/1983 |
| JP | H07-034342 | 6/1995 |

(Continued)

*Primary Examiner* — Benjamin R Schmitt
(74) *Attorney, Agent, or Firm* — Knobbe, Martens, Olson & Bear, LLP

(57) ABSTRACT

A sensor device includes sensors and an Electronic Control Unit (ECU). The sensors include sensor elements, a signal comparator, and a signal transmitter. The signal comparator compares a first main detection value from one of the sensor elements, and a first sub detection value from the other of the sensor elements. When the first main detection value matches the first sub detection value, the signal transmitter generates and transmits an output signal that includes a first main signal corresponding to the first main detection value without including a first sub signal corresponding to the first sub detection value. In such manner, the responsiveness of the sensor device may be improved, without deteriorating a reliability of the output signals from the sensor sections.

10 Claims, 15 Drawing Sheets

(56) References Cited

U.S. PATENT DOCUMENTS

2015/0066301 A1 3/2015 Kozawa
2016/0339945 A1 11/2016 Kozawa et al.

FOREIGN PATENT DOCUMENTS

| JP | 2001-79693 A | 3/2001 |
| JP | 2007-161006 A | 6/2007 |
| JP | 2007-286786 A | 11/2007 |
| JP | 2015-010847 | 1/2015 |

* cited by examiner

SENSOR DEVICE

CROSS REFERENCE TO RELATED APPLICATION

The present application is based on and claims the benefit of priority of Japanese Patent Application No. 2015-148583, filed on Jul. 28, 2015, the disclosure of which is incorporated herein by reference.

TECHNICAL FIELD

The present disclosure generally relates to a sensor device.

BACKGROUND INFORMATION

A sensor device is, as disclosed in a patent document 1 for example, provided with a sensor section that has two detectors and a controller that performs an operation/calculation based on a signal transmitted from the sensor section. More practically, the sensor device in a patent document, Japanese Patent Laid-Open No. 2015-046770 (patent document 1) has a torque sensor and a microcontroller. The torque sensor includes two Hall elements and an interface circuit that generates and transmits an output signal including two detection signals respectively corresponding to detection values from the Hall elements. The microcontroller compares the two detection signals transmitted from the torque sensor, for determining an abnormality of the Hall elements.

In principle, the shorter the length of the output signal transmitted from the torque sensor, the shorter the transmission interval of the output signal from the torque sensor can be, thereby improving responsiveness of the sensor device. However, the device in the patent document 1 transmits two detection signals to the microcontroller by serial transmission, for enabling an abnormality determination of the Hall elements by the microcontroller. Therefore, the device in the patent document 1 has a longer output signal length, in comparison to a transmission of one detection signal, thereby increasing the transmission interval and deteriorating the responsiveness.

SUMMARY

It is an object of the present disclosure to provide a sensor device having an improved responsiveness, which is enabled without deteriorating the reliability of the output signal transmitted from a sensor section.

In an aspect of the present disclosure, the sensor device includes: one or more sensor sections and a controller. The sensor section has a main detector and a sub detector respectively detecting an amount regarding a detection object, a signal comparator comparing a main detection value from the main detector and a sub detection value from the sub detector, and a signal transmitter generating and transmitting an output signal that includes a main signal corresponding to the main detection value without including a sub signal corresponding to the sub detection value, when the main detection value and the sub detection value are matching. The controller includes a signal obtainer that obtains the output signal, and a calculator that performs calculation based on the output signal obtained by the signal obtainer.

According to the present disclosure, the sensor section has the signal comparator that compares the main detection value and the sub detection value. Therefore, the sensor section is enabled to determine abnormality of each of the detectors. Further, when each of the detectors is normal, by generating and transmitting the output signal that includes the main signal without including the sub signal, the signal length of the output signal is reduced, i.e., shortened or shrunk. Therefore, without deteriorating the reliability of the output signal transmitted from the sensor section, the responsiveness of the sensor device is improved.

Throughout the specification and claims, what the main detection value matches the sub detection value means not only a complete matching between the main and sub detection values, but also a partial matching therebetween, i.e., when a difference between the main and sub detection values is equal to or smaller than a preset value. Therefore, in other words, the mismatch of the main and sub detection values means that the difference between the main and sub detection values is greater than the preset value.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, plural embodiments of the present disclosure are described based on the drawings.

Hereafter, same numerals are assigned to same components in the following embodiments, and descriptions of the same components are not repeated.

First Embodiment

The first embodiment of the present disclosure is described based on FIGS. 1-6.

Figure 1:
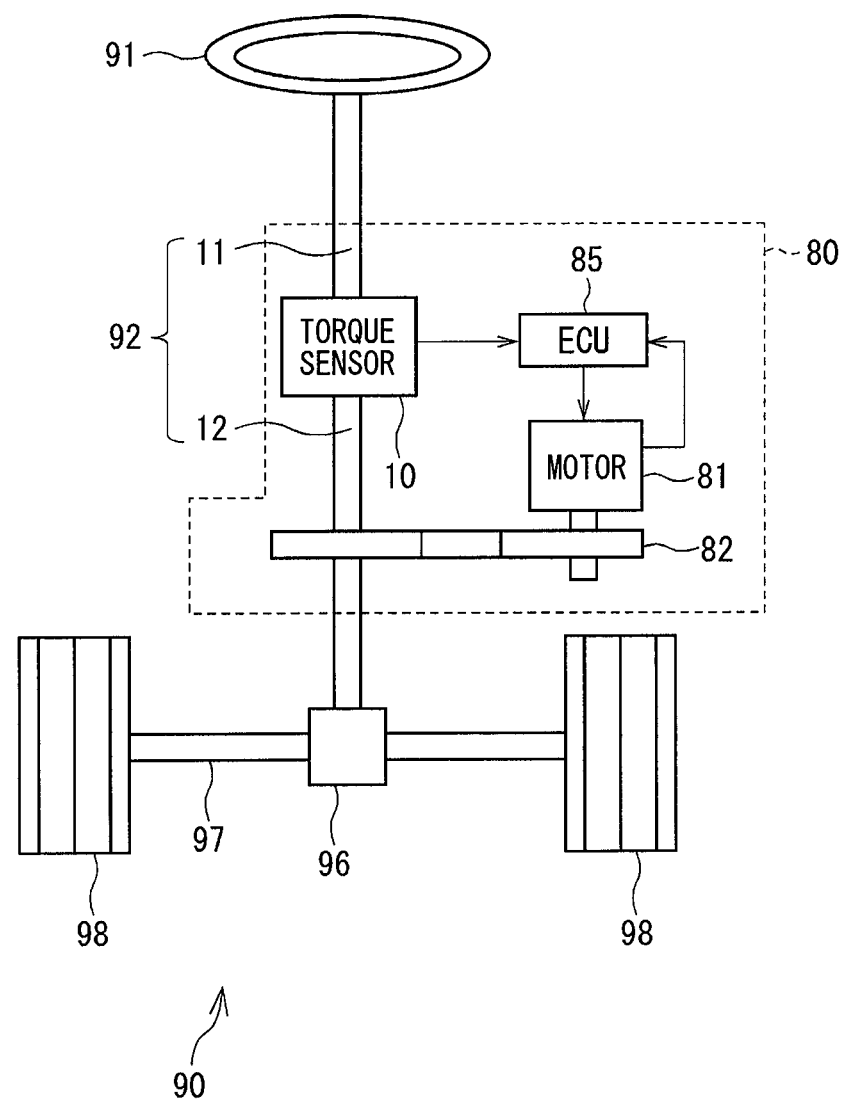
FIG. 1 is an illustration diagram of an electric power steering device in a first embodiment of the present disclosure.
Figure 2:
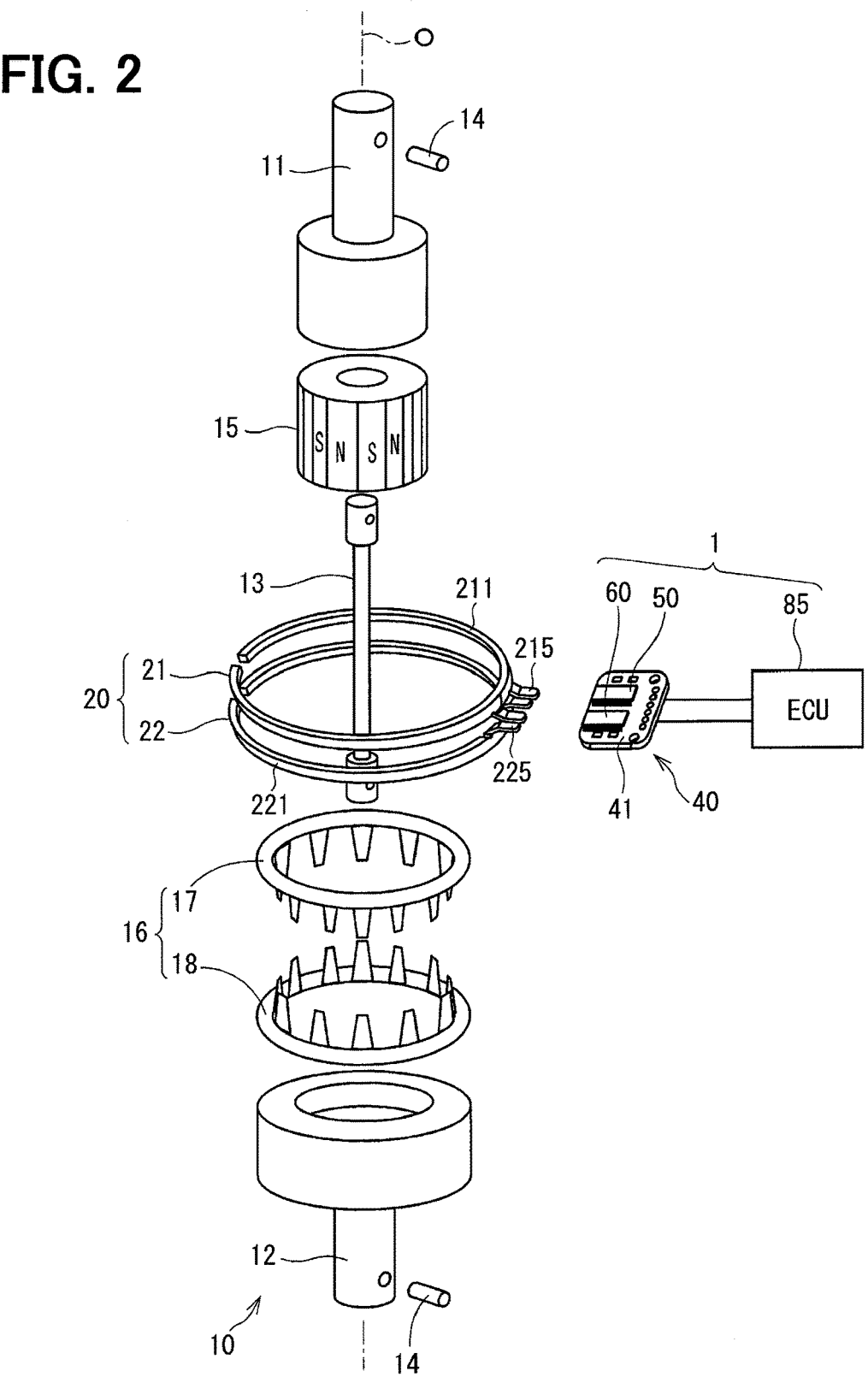
FIG. 2 is a perspective exploded diagram of a torque sensor in the first embodiment of the present disclosure.

As shown in FIGS. 1 and 2, a sensor device 1 is applied to an electric power steering apparatus 80, in which an Electronic Control Unit (ECU) 85 is provided together with a first magnetic sensor 50, a second magnetic sensor 60, and the like, for example, for assisting a steering operation of a vehicle. The first and second magnetic sensors 50, 60 are "sensor sections" in claims. the ECU 85 is a "controller" in claims.

The entire configuration of a steering system 90 having the electric power steering apparatus 80 is described. As shown in FIG. 1, a steering wheel 91 as a steering component is connected with a steering shaft 92.

The steering shaft 92 has an input shaft 11 and an output shaft 12. The input shaft 11 is connected with the steering wheel 91. At a position between the input shaft 11 and the output shaft 12, a torque sensor 10 detecting a torque applied to the steering shaft 92 is disposed. A pinion gear 96 is disposed on one end of the output shaft 12 opposite to the input shaft 11. The pinion gear 96 engages with a rack shaft 97. A pair of wheels 98 is connected with both ends of the rack shaft 97 via a tie rod etc.

When a driver rotates the steering wheel 91, the steering shaft 92 connected with the steering wheel 91 rotates. The rotation of the steering shaft 92 is turned into a translational motion of the rack shaft 97 by the pinion gear 96, and the pair of wheels 98 is steered by an angle according to an amount of displacement of the rack shaft 97.

The electric power steering apparatus 80 is provided with a motor 81 that outputs an assist torque for assisting a steering operation of the steering wheel 91 by the driver, a speed reduction gear 82, the torque sensor 10, the ECU 85 and the like. Although the motor 81 and the ECU 85 have separate bodies in FIG. 1, they may be combined to have one body.

The speed reduction gear 82 reduces a rotation speed of the motor 81, and transmits the rotation of the motor 81 to the steering shaft 92. That is, although the electric power steering apparatus 80 of the present embodiment is a so-called "column assistant type", the apparatus 80 may also be a "rack assist type" that transmits rotation of the motor 81 to the rack shaft 97. The details of the ECU 85 are mentioned later.

As shown in FIG. 2, the torque sensor 10 is provided with the input shaft 11, the output shaft 12, a torsion bar 13, a multipolar magnet 15, a magnetic yoke 16, a detection object, such as a magnetic flux collection module 20, a sensor unit 40 and the like.

The torsion bar 13 has one end connected with the input shaft 11, and the other end connected with the output shaft 12 by a pin 14, respectively, and connects the input shaft 11 and the output shaft 12 on the same axis, i.e., coaxially connects the shaft 11 and the shaft 12 on a rotation axis O. The torsion bar 13 is an elastic member in a rod shape, and converts a torque applied to the steering shaft 92 into a twist displacement.

The multipolar magnet 15 is formed in a cylinder shape, and is fixed to the input shaft 11. On the multipolar magnet 15, an N pole and an S pole are magnetized by turns along a periphery. Although the number of poles may be arbitrarily determined, the number of N poles and S poles is configured to be 12 pairs, having a total of 24 poles in the present embodiment. The magnetic yoke 16 is held by a yoke attachment component which is formed by a nonmagnetic material, e.g., resin, and which is not illustrated, and forms a magnetic circuit in a magnetic field that is generated by the multipolar magnet 15.

The magnetic yoke 16 includes a first yoke 17 and a second yoke 18, and the first yoke 17 is disposed on one side of the yoke 16 close to the input shaft 11, and the second yoke 18 is disposed on the other side of the yoke 16 close to the output shaft 12. Both of the first yoke 17 and the second yoke 18 have an annular shape, and are made with a soft magnetic material, and are fixedly attached to the output shaft 12 on a radius outside of the multipolar magnet 15.

The magnetic flux collection module 20 includes magnetic flux collection rings 21 and 22. The magnetic flux collection rings 21 and 22 are arranged on a radius outside of the magnetic yoke 16, and collect the magnetic flux from the magnetic yoke 16. A first magnetic flux collection ring 21 is disposed on one side of the module 20 close to the input shaft 11, and a second magnetic flux collection ring 22 is disposed on the other side of the module 20 close to the output shaft 12. The first magnetic flux collection ring 21 and the second magnetic flux collection ring 22 are held by a non-illustrated magnetic flux collection ring holder member that is formed by an insert molding etc.

The first magnetic flux collection ring 21 comprises (i) a ring part 211 that is made with the soft magnetic material substantially in a ring shape and (ii) two magnetic flux collecting parts 215 projecting toward a radius outside from the ring part 211. The number of the magnetic flux collecting parts 215 may be configured to match the number of the magnetic sensors 50, 60 mentioned in the following.

The second magnetic flux collection ring 22 comprises (i) a ring part 221 that is made with the soft magnetic material substantially in a ring shape, just like the first magnetic flux collection ring 21, and two magnetic flux collecting parts 225 projecting toward a radius outside from the ring part 221.

In the present embodiment, the first magnetic flux collection ring 21 and the second magnetic flux collection ring 22 have substantially the same form.

The magnetic flux collecting part 215 of the first magnetic flux collection ring 21 and the magnetic flux collecting part 225 of the second magnetic flux collection ring 22 are disposed to face each other, and have respective facing surfaces arranged substantially in parallel.

The magnetic sensors 50 and 60 are arranged at a position between the magnetic flux collecting parts 215 and 225.

The sensor unit 40 includes a substrate 41 and the magnetic sensors 50 and 60. The magnetic sensors 50 and 60 are mounted on the same surface of the substrate 41.

The first magnetic sensor 50 outputs, i.e., transmits, a first output signal Sd10 to the ECU 85, and the second magnetic sensor 60 outputs, i.e., transmits, a second output signal Sd20 to the ECU 85.

Figure 3:
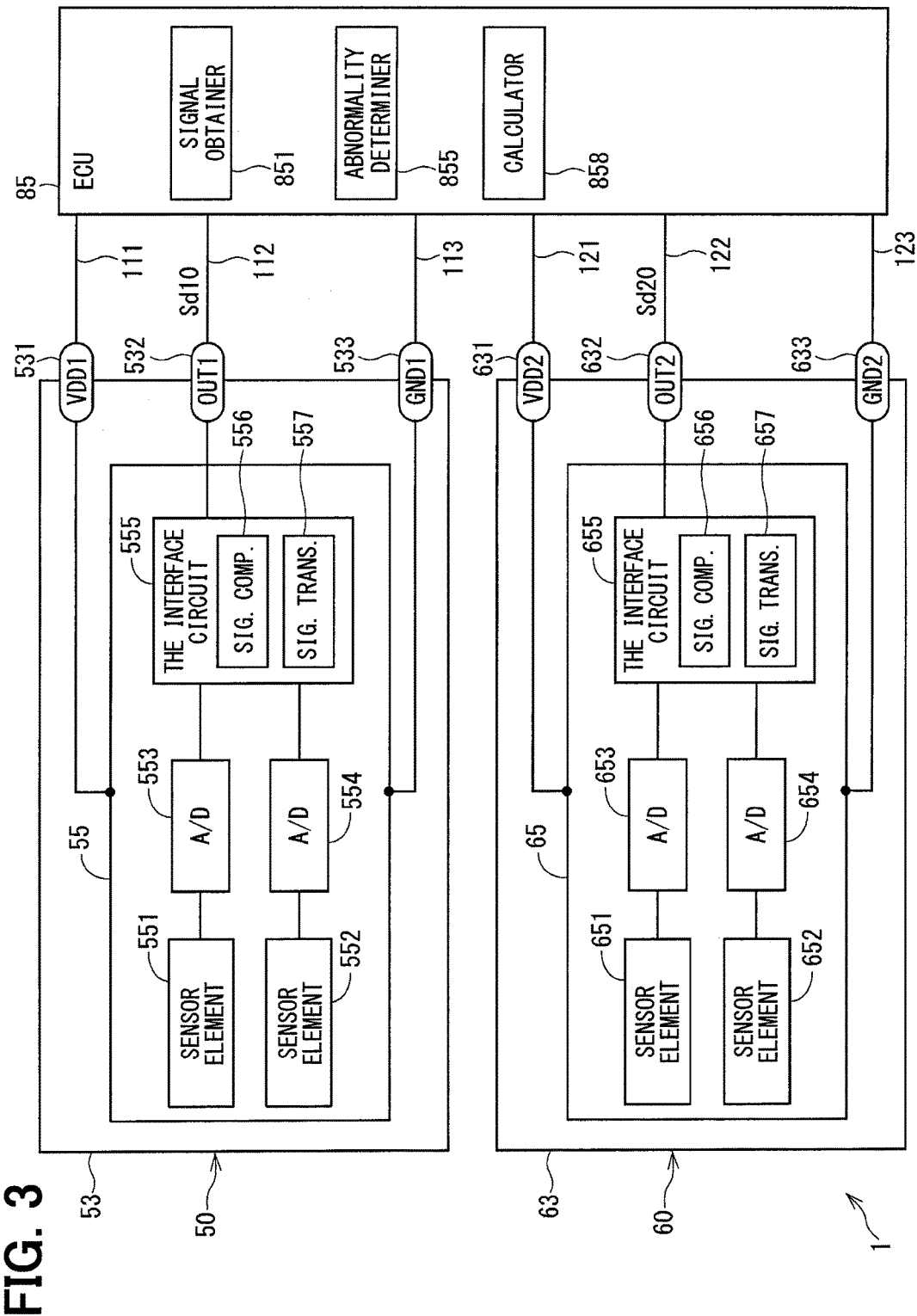
FIG. 3 is a block diagram of a sensor device in the first embodiment of the present disclosure.

As shown in FIG. 3, the first magnetic sensor 50 has a sealed body 53 and a first chip 55, and the second magnetic sensor 60 has a sealed body 63 and a second chip 65.

The configuration concerning the first magnetic sensor 50 is hereafter designated as 50-something numbers or 500-something numbers, and the configuration concerning the second magnetic sensor 60 is hereafter designated as 60-something numbers or 600-something numbers, suggesting that the same last one digit or last two digits indicate the same component/configuration. Hereafter, the description is focused on the first magnetic sensor 50, and the same configuration of the sensor 60 may be not repeated whenever appropriate.

The sealed body 53 seals the first chip 55. The sealed body 53 has a power supply terminal 531, a communication terminal 532, and a ground terminal 533 respectively disposed thereon and projecting therefrom.

The power supply terminal 531 is connected to the ECU 85 by a first power source line 111, and the communication terminal 532 thereof is connected to the ECU 85 by a first communication line 112, and the ground terminal 533 thereof is connected to the ECU 85 by a first ground line 113.

Further, a power supply terminal 631 is connected to the ECU 85 by a second power source line 121, and a communication terminal 632 is connected to the ECU 85 by a second communication line 122, and a ground terminal 633 is connected to the ECU 85 by a second ground line 123.

The voltage adjusted to a predetermined voltage value is supplied to the power supply terminals 531 and 631 from a regulator of the ECU 85 (not illustrated). The ground terminals 533 and 633 are connected with the ground via the ECU 85.

The communication terminal 532 and the first communication line 112 are used for communications between the first magnetic sensor 50 and the ECU 85. According to the present embodiment, the first output signal Sd10 is transmitted to the ECU 85 from the first magnetic sensor 50 via the communication terminal 532 and the first communication line 112.

Further, the communication terminal 632 and the second communication line 122 are used for communications between the second magnetic sensor 60 and the ECU 85. According to the present embodiment, the second output signal Sd20 is transmitted to the ECU 85 from the second magnetic sensor 60 via the communication terminal 632 and the second communication line 122.

The first chip 55 includes a first main sensor element 551 (i.e., a main detector), a first sub sensor element 552 (i.e., a sub detector), Analog-to-Digital (A/D)-conversion circuits 553 and 554, and a first interface circuit 555 and the like.

The sensor elements 551 and 552 are respectively a magnetic flux detecting element that detects the magnetic flux between the magnetic flux collecting parts 215 and 225. The sensor elements 551 and 552 in the present embodiment are respectively implemented as a Hall element. Even though the sensor elements 551 and 552 are designated as "main" and "sub" elements in the present embodiment, for a distinction of signal orders, i.e., a sequence of signals, in the first output signal Sd10, the first main sensor element 551 and the first sub sensor element 552 are substantially the same element.

The A/D-conversion circuit 553 performs an A/D conversion of an analog signal indicative of a first main detection value detected by the first main sensor element 551. The A/D-conversion circuit 554 performs an A/D conversion of an analog signal indicative of a first sub detection value detected by the first sub sensor element 552.

The first interface circuit 555 has a signal comparator 556 and a signal transmitter 557. The signal comparator 556 compares the first main detection value with the first sub detection value. Specifically, it is determined whether the first main detection value and the first sub detection value are matching.

According to the present embodiment, when the difference between both detection values is equal to or less than a predetermined value, it is considered that both detection values are matching, and when the difference between both detection values is larger than the predetermined value, both detection values are mismatched (i.e., it is considered that both (i.e., the two) detection values are not matching, unequal, or different from each other).

The signal transmitter 557 generates the first output signal Sd10 based on the comparison result by the signal comparator 556. The first output signal Sd10 generated by the transmitter 557 is transmitted to the ECU 85 via the communication terminal 532 by the Single Edge Nibble Transmission (SENT) communication which is a kind of digital communications.

According to the present embodiment, when the first main detection value and the first sub detection value are matching, the signal transmitter 557 generates and transmits the first output signal Sd10, which includes the first main signal corresponding to the first main detection value, and which does not include the first sub signal corresponding to the first sub detection value.

Further, when the first main detection value and the first sub detection value are not matching, the signal transmitter 557 generates and transmits the first output signal Sd10 including both of the first main signal and the first sub signal. The details of the first output signal Sd10 are mentioned later.

The second interface circuit 655 has the signal comparator 656 and the signal transmitter 657. The signal comparator 656 compares the second main detection value from a second main sensor element 651 with the second sub detection value by a second sub sensor element 652. Specifically, it is determined whether the second main detection value and the second sub detection value are matching.

According to the present embodiment, when the difference between both detection values is equal to or less than the predetermined value, it is considered that both detection values are matching, and when the difference of both detection values is larger than the predetermined value, it is considered that both, i.e., the two, detection values are not matching.

The signal transmitter 657 generates the second output signal Sd20 based on the comparison result by the signal comparator 656. The second output signal Sd20 generated by the transmitter 657 is transmitted to the ECU 85 by the SENT communication via the communication terminal 632.

According to the present embodiment, when the second main detection value and the second sub detection value are matching, the signal transmitter 657 generates and transmits the second output signal Sd20, which includes the second main signal corresponding to the second main detection value, and which does not include the second sub signal corresponding to the second sub detection value.

Further, when the second main detection value and the second sub detection value are not matching, the signal transmitter 657 generates the second output signal Sd20 including both of the second main signal and the second sub signal. The details of the second output signal Sd20 are mentioned later.

Although the process in each of the function sections that is provided in the interface circuits 555 and 655 of the present embodiment is a hardware process by a dedicated electronic circuit for such process, the process may be a software process by an execution of a stored program by the CPU.

The ECU 85 may be a microcontroller or the like, and includes a signal obtainer 851, an abnormality determiner 855, a calculator 858 and the like.

The signal obtainer 851 obtains the output signals Sd10 and Sd20 that are transmitted from the magnetic sensors 50 and 60.

The abnormality determiner 855 determines whether the magnetic sensors 50 and 60 are normal or abnormal. The details of abnormality determination are mentioned later.

The calculator 858 performs various operations/calculations based on the output signal transmitted from the magnetic sensor that is determined as normal from among the magnetic sensors 50 and 60.

According to the present embodiment, the calculator 858 calculates a target value of a steering torque based on the output signal. The calculated target value of the steering torque is used for the drive control of the motor 81.

The process in each of the function sections that is provided in the ECU 85 may be a software process by an execution of a stored program by CPU, or may be a hardware process by the dedicated electronic circuit.

Figure 4:
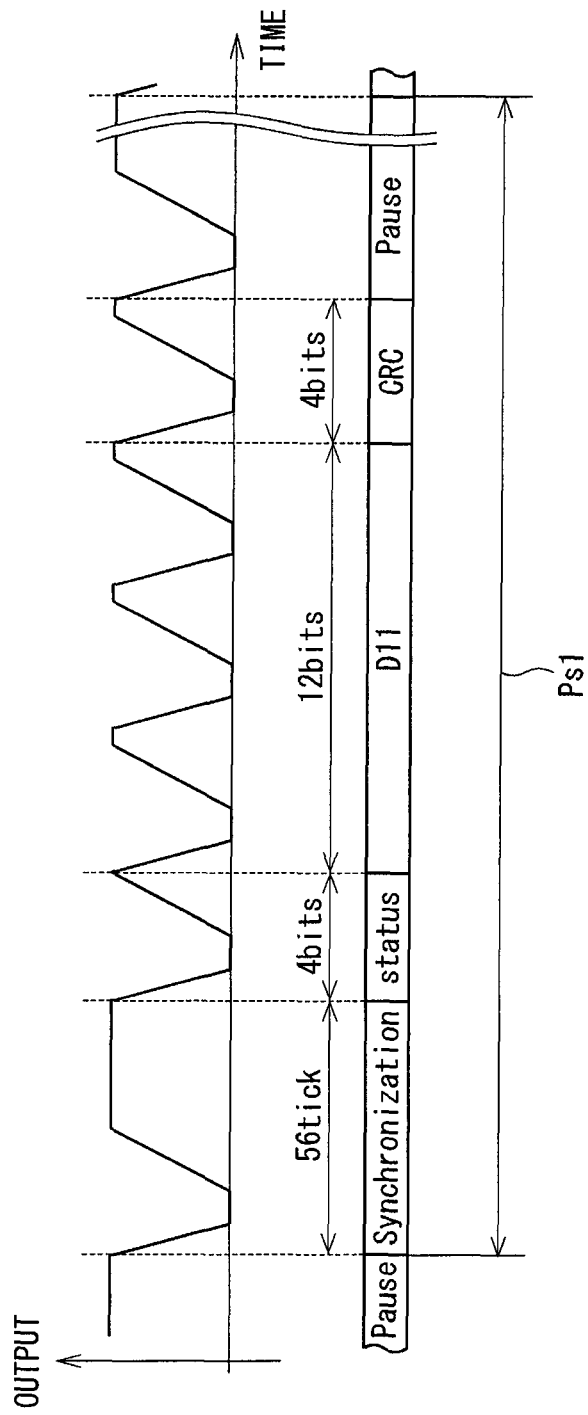
FIG. 4 is a time chart of an output signal when a main detection value matches a sub detection value in the first embodiment of the present disclosure.
Figure 5:
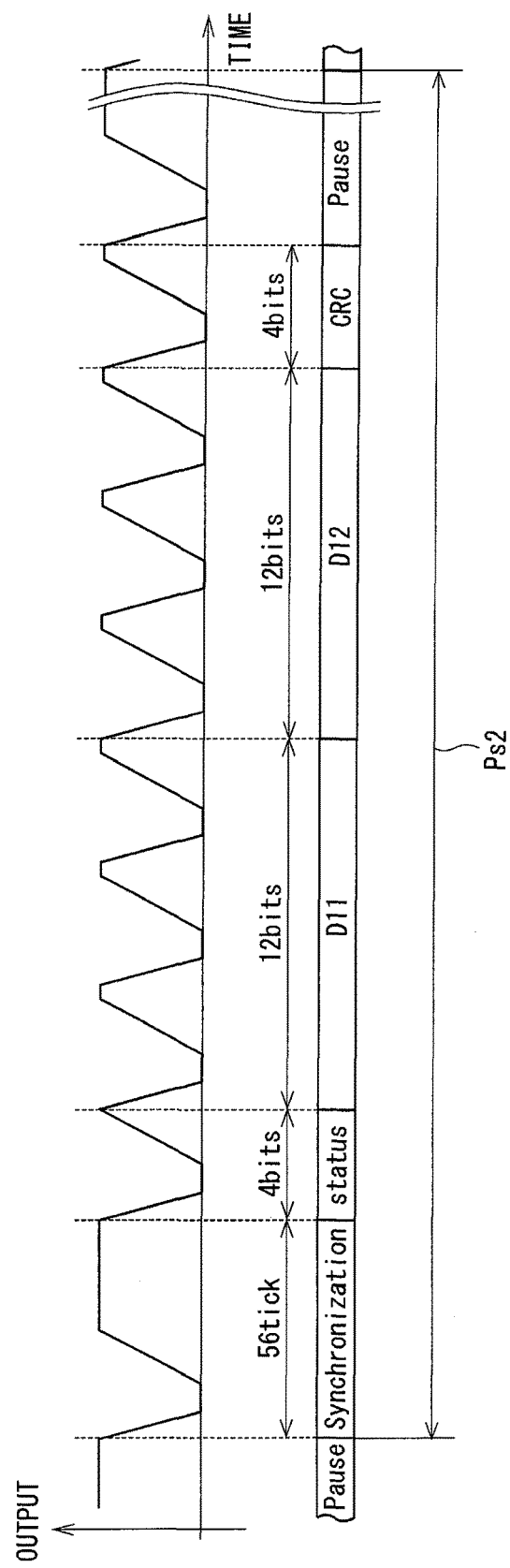
FIG. 5 is a time chart of an output signal when a main detection value does not match a sub detection value in the first embodiment of the present disclosure.

Now, details of the first output signal Sd10 are described based on FIG. 4 and FIG. 5. Since the first output signal Sd10 and the second output signal Sd20 are substantially the same, the following description focuses on the first output signal Sd10. Note that the number of bits shown in FIG. 4 and FIG. 5 is just an example, and may be arbitrarily set up according to the telecommunications standard etc.

The contents of the first output signal Sd10 are different depending on the matching between the first main detection value and the first sub detection value. That is, when the first main detection value and the first sub detection value are matching, i.e., the first main detection value is equal to the first sub detection value, the first output signal Sd10 is made up from a synchronization signal, a status signal, a first main signal D11, a Cyclic Redundancy Check (CRC) signal, and a pause signal, as shown in FIG. 4, and the first output signal Sd10 is outputted as a series of signals in the above-described order.

On the other hand, when the first main detection value and the first sub detection value do not match, i.e., are mismatched or different, or the first main detection value is not equal to the first sub detection value, the first output signal Sd10 is made up from the synchronization signal, the status signal, the first main signal D11, first sub signal D12, the CRC signal, and the pause signal, as shown in FIG. 5, and the first output signal Sd10 is outputted as a series of signals in the above-described order.

The synchronization signal is a signal for synchronizing the magnetic sensor 50 and the clock of the ECU 85, and is set to 56 tick in the present embodiment. According to the present embodiment, the correction coefficient is calculated based on the length of the synchronization signal, and each signal is corrected by using the correction coefficient. For performing an abnormality determination process described later, the corrected signal that is corrected by the correction coefficient is used.

The first main signal D11 and the first sub signal D12 are respectively set to have 3 nibbles (=12 bits). The contents of data represented by each signal may have at least 1 nibble, according to the communication standard.

Figure 6:
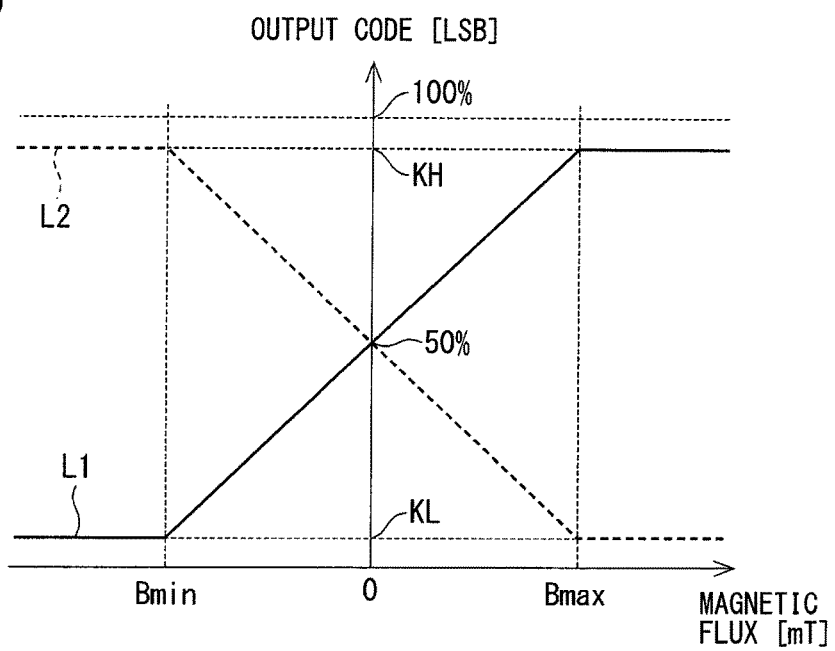
FIG. 6 is an illustration diagram of a first main data value and a first sub data value in the first embodiment of the present disclosure.

As shown in FIG. 6, the first main signal D11 and the first sub signal D12 are signals according to the magnetic flux between the magnetic flux collecting parts 215 and 225, and are reversed from each other about a certain center value. In the present embodiment, the certain center value is a 50% value of an output code.

More practically, as shown by a solid line L1, the first main signal D11 takes a lower limit value KL when the magnetic flux density is equal to or less than Bmin, and takes an upper limit value KH when the magnetic flux density is equal to or greater than Bmax, and the signal value of D11 increases as the magnetic flux density increases from Bmin to Bmax.

Further, as shown by a dashed line L2, the first sub signal D12 takes the upper limit value KH when the magnetic flux density is equal to or less than Bmin, and takes the lower limit value KL when the magnetic flux density is equal to or greater than Bmax, and the signal value of D12 decreases as the magnetic flux density increases from Bmin to Bmax. Note that the value KL may be equal to 0%, and the value KH may be equal to 100%.

In FIG. 5, the first main signal D11 and the first sub signal D12 are illustrated as an identical pulse for illustration and simplification purposes. However, the pulses for the signals D11 and D12 are actually the reversed pulses about a certain center value, according to the detection value of the magnetic flux density.

When a data value indicated by the first main signal D11 is designated as a first main data value, and a data value indicated by the first sub signal D12 is designated as a first sub data value, according to the present embodiment, since the first main signal D11 and the first sub signal D12 are reversed from each other, the sum of the first main signal D11 and the first sub signal D12 is calculated as a preset value (henceforth a "theoretical addition value Va").

According to the present embodiment, since the first main signal D11 and the first sub signal D12 are respectively provided as a signal of 3 nibbles, theoretical addition value Va is the maximum value "FFF" which is the maximum of the binary data in 3 digits. Further, when either of the first main signal D11 or the first sub signal D12 has abnormality, the sum of the first main signal D11 and the first sub signal D12 is calculated as a different value that is different from theoretical addition value Va.

Returning to FIG. 4, the CRC signal is a signal for detecting the communication error, and the length of the CRC signal is calculated based on the signals D11 and D12. The pause signal is a signal outputted in a period before outputting the following synchronization signal.

Next, the process in the interface circuits 555 and 655 and the process in the ECU 85 are described with reference to FIGS. 7-9. These processes are performed when the magnetic sensors 50 and 60 and the ECU 85 are turned ON.

Figure 7:
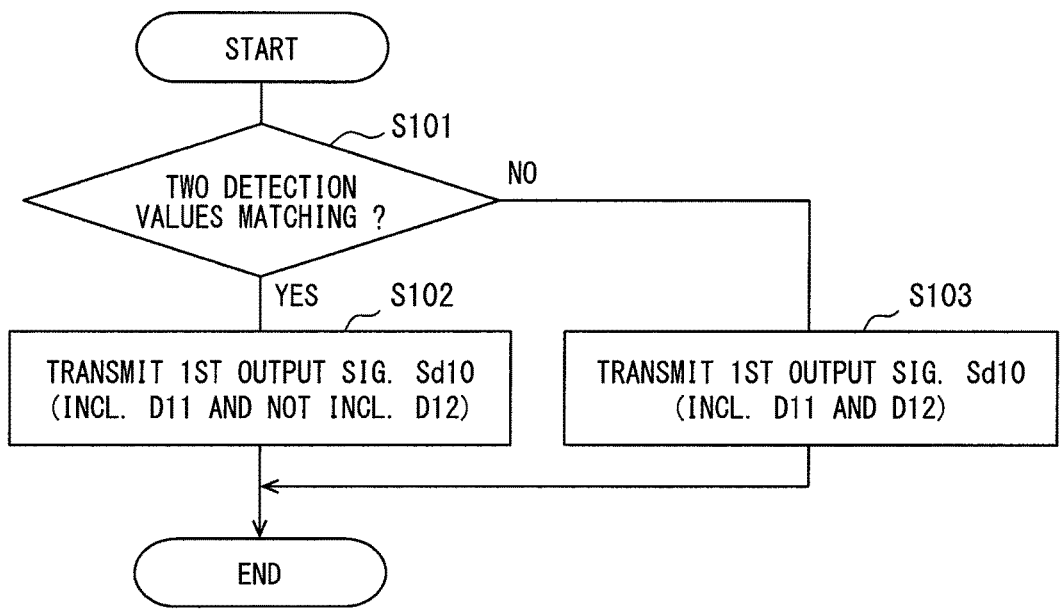
FIG. 7 is a flowchart of a process in an interface circuit of a first magnetic sensor in the first embodiment of the present disclosure.

FIG. 7 shows the process in the interface circuit 555. In Step S101 (hereafter, the "step" is omitted and a sign "S" is used) of FIG. 7, the signal comparator 556 determines whether the first main detection value and the first sub detection value are matching. When it is determined that the first main detection value and the first sub detection value are matching (S101:YES), the process proceeds to S102. When it is determined that the first main detection value and the first sub detection value are not matching (S101:NO), the process proceeds to S103.

In S102, the signal transmitter 557 generates and transmits the first output signal Sd10 which includes the first main signal D11, and which does not include first sub signal D12.

In S103, the signal transmitter 557 generates and transmits the first output signal Sd10 including the first main signal D11 and first sub signal D12.

Figure 8:
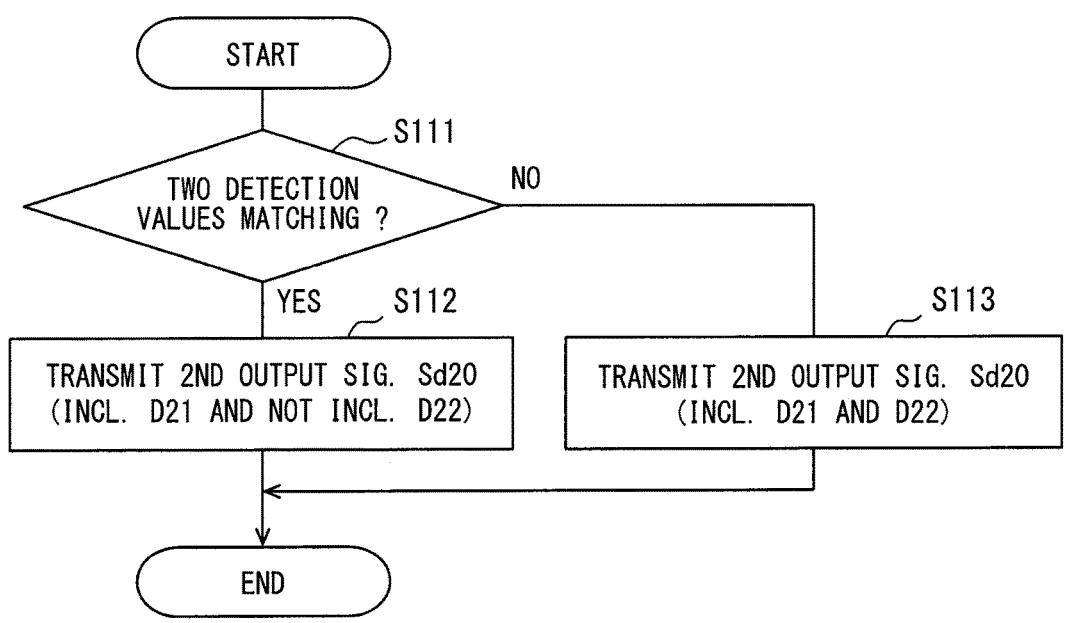
FIG. 8 is a flowchart of a process in an interface circuit of a second magnetic sensor in the first embodiment of the present disclosure.

FIG. 8 shows the process in the interface circuit 655.

In S111 of FIG. 8, the signal comparator 656 determines whether the second main detection value and the second sub detection value are matching. When it is determined that the second main detection value and the second sub detection value are matching (S111:YES), the process proceeds to S112. When it is determined that the second main detection value and the second sub detection value are not matching (S111:NO), the process proceeds to S113.

In S112, the signal transmitter 657 generates and transmits the second output signal Sd20 which includes the second main signal D21, and which does not include the second sub signal D22.

In S113, the signal transmitter 657 generates and transmits the second output signal Sd20 including first main signal D21 and the second sub signal D22.

Figure 9:
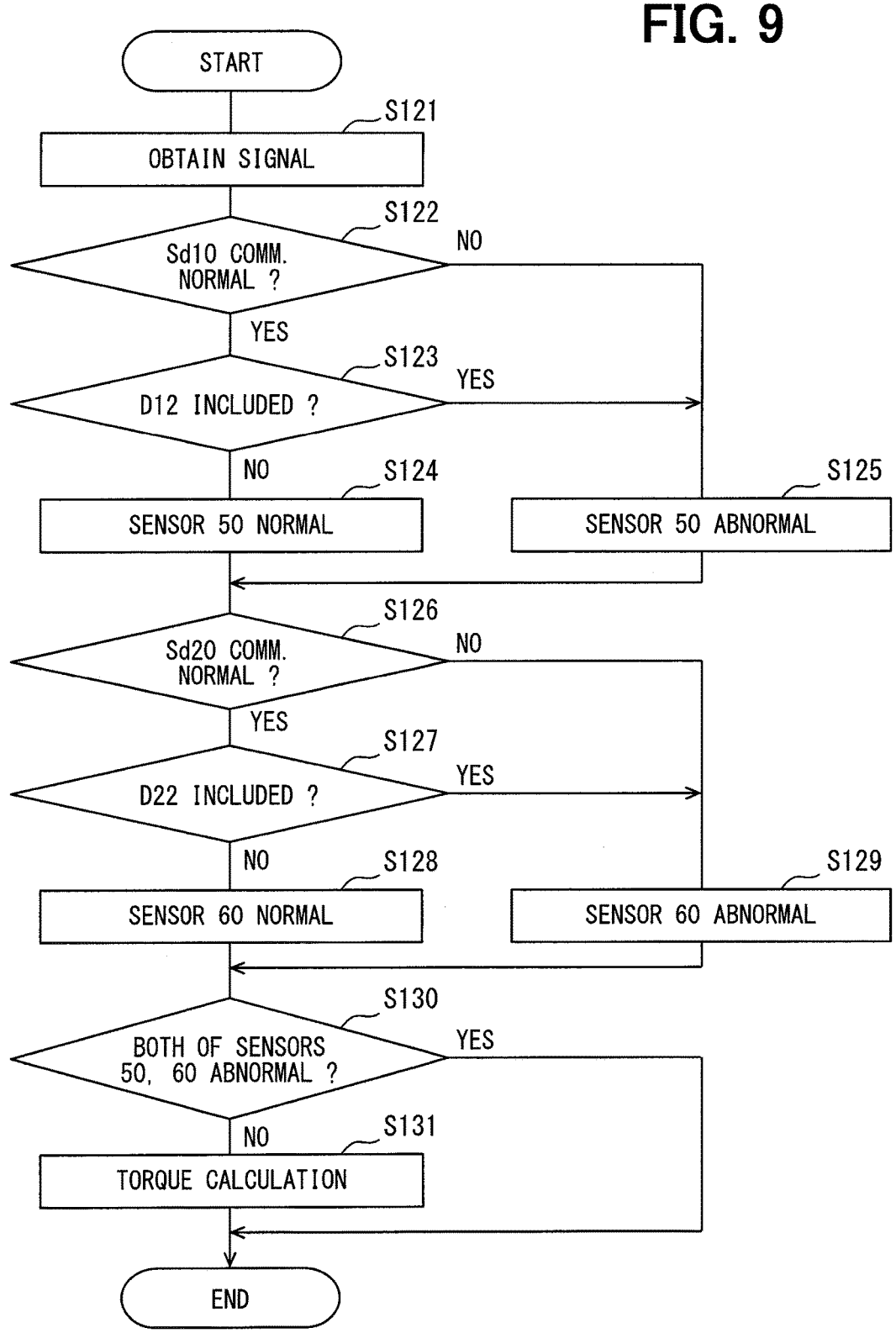
FIG. 9 is a flowchart of a process in an ECU in the first embodiment of the present disclosure.

FIG. 9 shows the process in the ECU 85.

In S121 of FIG. 9, the signal obtainer 851 obtains the output signals Sd10 and Sd20.

In S122, the abnormality determiner 855 determines whether communication of the first output signal Sd10 is normal, based on the CRC signal of the first output signal Sd10. When communication of the first output signal Sd10 is determined as abnormal (S122:NO), the process proceeds to S125. When communication of the first output signal Sd10 is determined as normal (S122:YES), the process proceeds to S123.

In S123, the abnormality determiner 855 determines whether the first sub signal D12 is included in the first output signal Sd10. For example, when the number of pulses between the status signal and the CRC signal is six in the first output signal Sd10, it is determined that first sub signal D12 is included in the first output signal Sd10. When it is determined that the first sub signal D12 is included in the first output signal Sd10 (S123:YES), the process proceeds to S125. When it is determined that the first sub signal D12 is not included in the first output signal Sd10 (S123:NO), the process proceeds to S124.

In S124, the abnormality determiner 855 determines that the first magnetic sensor 50 is normal.

In S125, the abnormality determiner 855 determines that the first magnetic sensor 50 is abnormal.

In S126, which is subsequent to S124 or S125, the abnormality determiner 855 determines whether communication of the second output signal Sd20 is normal based on the CRC signal of the second output signal Sd20.

When communication of the second output signal Sd20 is determined as abnormal (S126:NO), the process proceeds to S129.

When communication of the second output signal Sd20 is determined as normal (S126:YES), the process proceeds to S127.

In S127, the abnormality determiner 855 determines whether the second sub signal D22 is included in the second output signal Sd20. For example, when the number of pulses between the status signal and the CRC signal is six in the second output signal Sd20, it is determined that the second sub signal D22 is included in the second output signal Sd20. When it is determined that the second sub signal D22 is included in the second output signal Sd20 (S127:YES), the process proceeds to S129. When it is determined that the second sub signal D22 is not included in the second output signal Sd20 (S127:NO), the process proceeds to S128.

In S128, the abnormality determiner 855 determines that the second magnetic sensor 60 is normal.

In S129, the abnormality determiner 855 determines that the second magnetic sensor 60 is abnormal.

In S130, it is determined whether both of the magnetic sensors 50 and 60 are abnormal. When both the magnetic sensors 50 and 60 are determined as abnormal (S130:YES), the calculation of the steering torque in S131 is not performed. When it is determined that at least one the magnetic sensors 50 and 60 is normal (S130:NO), the process proceeds to S131.

In S131, the calculator 858 calculates a steering torque by using the main signal of the output signal transmitted from the magnetic sensor that is determined as normal among the magnetic sensors 50 and 60.

When both the magnetic sensors 50 and 60 are normal, an average value of the first main signal D11 and the second main signal D21, etc. may be used, or either one of the first main signal D11 or the second main signal D21 may be used for the steering torque calculation.

As described in full details above, the sensor device 1 of the present embodiment is provided with two magnetic sensors 50 and 60 and the ECU 85.

The first magnetic sensor 50 has two sensor elements 551 and 552 and the first interface circuit 555, which includes the signal comparator 556 and the signal transmitter 557. The sensor elements 551 and 552 detect an amount regarding the detection object, i.e., the magnetic flux density between the magnetic flux collecting parts 215 and 225.

The signal comparator 556 compares the first main detection value from the first main sensor element 551 with the first sub detection value from the first sub sensor element 552.

When the first main detection value and the first sub detection value are matching, the signal transmitter 557 generates and transmits the first output signal Sd10, which includes the first main signal D11 corresponding to the first main detection value, and which does not include the first sub signal D12 corresponding to the first sub detection value.

The second magnetic sensor 60 is configured in the same manner as the first magnetic sensor 50.

The ECU 85 has the signal obtainer 851 and the calculator 858. The signal obtainer 851 obtains the first output signal Sd10 and the second output signal Sd20.

The calculator 858 performs the calculation based on the output signals Sd10 and Sd20 which are obtained by the signal obtainer 851.

Since the signal comparators 556 and 656, which compare the main detection value with the sub detection value are provided in the magnetic sensors 50 and 60, the abnormality of the sensor elements 551, 552, 651, and 652 are determinable in the magnetic sensors 50 and 60.

Further, when the sensor elements 551 and 552 are normal, the length of the first output signal Sd10 is relatively short by generating and transmitting the first output signal Sd10 in a manner that selectively includes the main signal and the sub signal, i.e., by including the main signal, but not including the sub signal. That is, a transmission period Ps1 of the first output signal Sd10 shown in FIG. 4 becomes shorter than a transmission period Ps2 of the first output signal Sd10 shown in FIG. 5. The same applies to the second output signal Sd20. Therefore, the sensor device 1 is enabled to have an improved responsiveness, without deteriorating the reliability of the output signals Sd10 and Sd20 transmitted from the magnetic sensors 50 and 60.

In the first embodiment, when the first main detection value and the first sub detection value are not matching, the signal transmitter 557 generates and transmits the first output signal Sd10 including the first main signal D11 and the first sub signal D12.

When the second main detection value and the second sub detection value are not matching, the signal transmitter 657 generates and transmits the second output signal Sd20 including the second main signal D21 and the second sub signal D22.

The abnormality determiner 855 of the ECU 85 determines that the first magnetic sensor 50 is abnormal, when the first sub signal D12 is included in the first output signal Sd10 which is obtained by the signal obtainer 851. Further, the abnormality determiner 855 determines that the second magnetic sensor 60 is abnormal, when the second sub signal D22 is included in the second output signal Sd20 which is obtained by the signal obtainer 851.

In such manner, the ECU 85 can determine the abnormality of the magnetic sensors 50 and 60 based on whether the sub signals D12 and D22 exist, i.e., are included, in the output signals Sd10 and Sd20.

In the first embodiment, the first chip 55 has plural, i.e., two or more, sensor elements 551 and 552, and the second chip 65 has plural, two or more, sensor elements 651 and 652.

Therefore, even when the abnormality is caused in the second magnetic sensor 60, the abnormality determiner 855 is enabled to continue a self-monitoring of the first magnetic sensor 50 based on the detection values of two or more sensor elements 551 and 552 of the first magnetic sensor 50 which is determined as normal.

Similarly, even when the abnormality is caused in the first magnetic sensor 50, the abnormality determiner 855 is enabled to continue the self-monitoring of the second magnetic sensor 60 based on the detection values of two or more sensor elements 651 and 652 of the second magnetic sensor 60 which is determined as normal.

Thus, even when the abnormality is caused in one of the two magnetic sensors 50 and 60, the ECU 85 is enabled to continue the self/abnormality-monitoring of the other, i.e., normal, one of the two magnetic sensors 50 and 60, while calculating, with the same accuracy, the calculation of the steering torque as the both sensors normal time.

Further, the electric power steering apparatus 80 is provided with the sensor device 1, the motor 81, and the speed reduction gear 82 in the first embodiment. The motor 81 outputs the assist torque, which assists the steering operation of the steering wheel 91 by the driver. The speed reduction gear 82 transmits the torque of the motor 81 to the steering shaft 92 which is the drive object of the motor 81. The ECU 85 controls the drive of the motor 81 based on the steering torque.

In the first embodiment, since the steering assist for assisting the steering operation of the steering wheel 91 by the driver is continuable according to the steering torque, even when the abnormality is caused in one of the magnetic sensors 50 and 60, thereby improving the vehicle safety.

The ECU 85 may preferably notify the driver of the abnormality by using a warning lamp, a voice guidance or the like, when continuing the steering assist in an abnormality-caused state.

Second Embodiment

Figure 10:
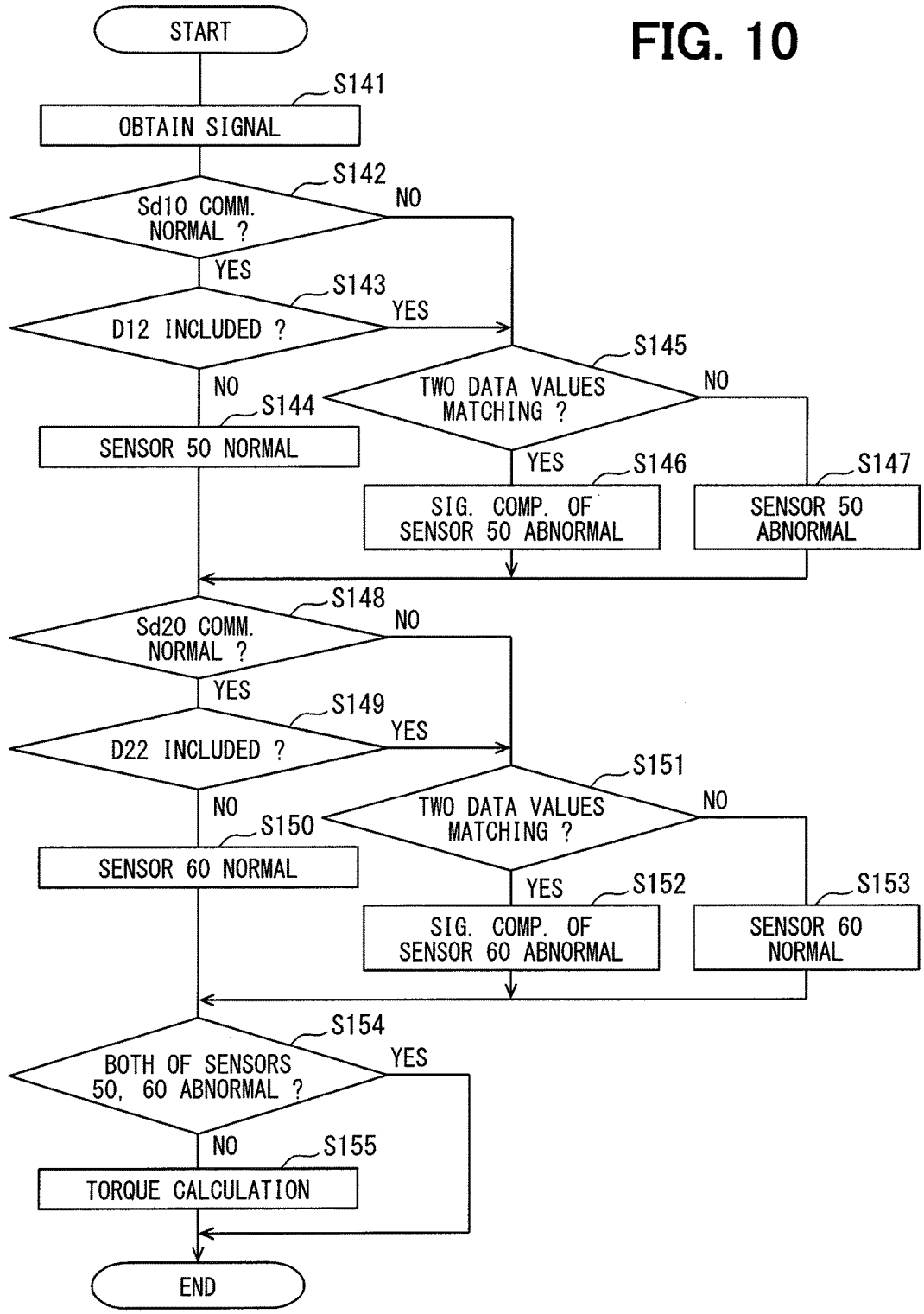
FIG. 10 is a flowchart of a process in an ECU in a second embodiment of the present disclosure.

The second embodiment of the present disclosure is shown in FIG. 10.

In the second embodiment, the process in the interface circuits 555 and 655 is the same as that of the first embodiment, and the abnormality determination process in the ECU 85 is different from the first embodiment. Hereafter, the abnormality determination process is described with reference to a flowchart shown in FIG. 10.

The process of each of S141-S144 in FIG. 10 is the same as the process of each of S121-S124 in FIG. 9. When a negative determination is performed in S142, and when an affirmation determination is performed in S143, the process proceeds to S145.

In S145, the abnormality determiner 855 determines whether the main data value indicated by the first main signal D11 of the first output signal Sd10 and an inverted value of the sub data value indicated by the first sub signal D12 shows are matching. When it is determined that the main data value and the inverted value of the sub data value are matching (S145:YES), the process proceeds to S146. When it is determined that the main data value and the inverted value of the sub data value are mismatched (S145: NO), the process proceeds to S147.

In S146, the abnormality determiner 855 determines that the first magnetic sensor 50 is, or more specifically, the signal comparator 556 is, abnormal. The process of each of S147-S150 is the same as the process of each of S125-S128 in FIG. 9.

When a negative determination is performed in S148, and when an affirmation determination is performed in S149, the process proceeds to S151.

In S151, the abnormality determiner 855 determines whether the main data value indicated by the second main signal D21 of the second output signal Sd20 and an inverted value of the sub data value indicated by the second sub signal D22 are matching. When it is determined that the main data value and the inverted value of the sub data value are matching (S151:YES), the process proceeds to S152. When it is determined that the main data value and the inverted value of the sub data value are mismatched (S151: NO), the process proceeds to S153.

In S152, the abnormality determiner 855 determines that the second magnetic sensor 60 is, or more specifically the signal comparator 656 is, abnormal.

The process of each of S153-S155 is the same as the process of each of S129-S131 in FIG. 9.

In the second embodiment as described above, the abnormality determiner 855 determines that, when (i) the first sub signal D12 is included in the first output signal Sd10 which is obtained by the signal obtainer 851 and (ii) the main data value of the first output signal Sd10 and the inverted value of the sub data value of the first output signal Sd10 are matching, the signal comparator 556 of the first magnetic sensor 50 is abnormal. Thereby, the abnormality determiner 556 in the magnetic sensor 50 can determine that the signal comparator 556 is abnormal.

Further, the abnormality determiner 855 determines that the signal comparator 656 of the second magnetic sensor 60 is abnormal, when (i) the second sub signal D22 is included in the second output signal Sd20 which is obtained by the signal obtainer 851 and (ii) the main data value of the second output signal Sd20 and the inverted value of the sub data value of the second output signal Sd20 are matching. Thereby, the abnormality determiner 855 can determine that the signal comparator 656 is abnormal.

Third Embodiment

Figure 11:
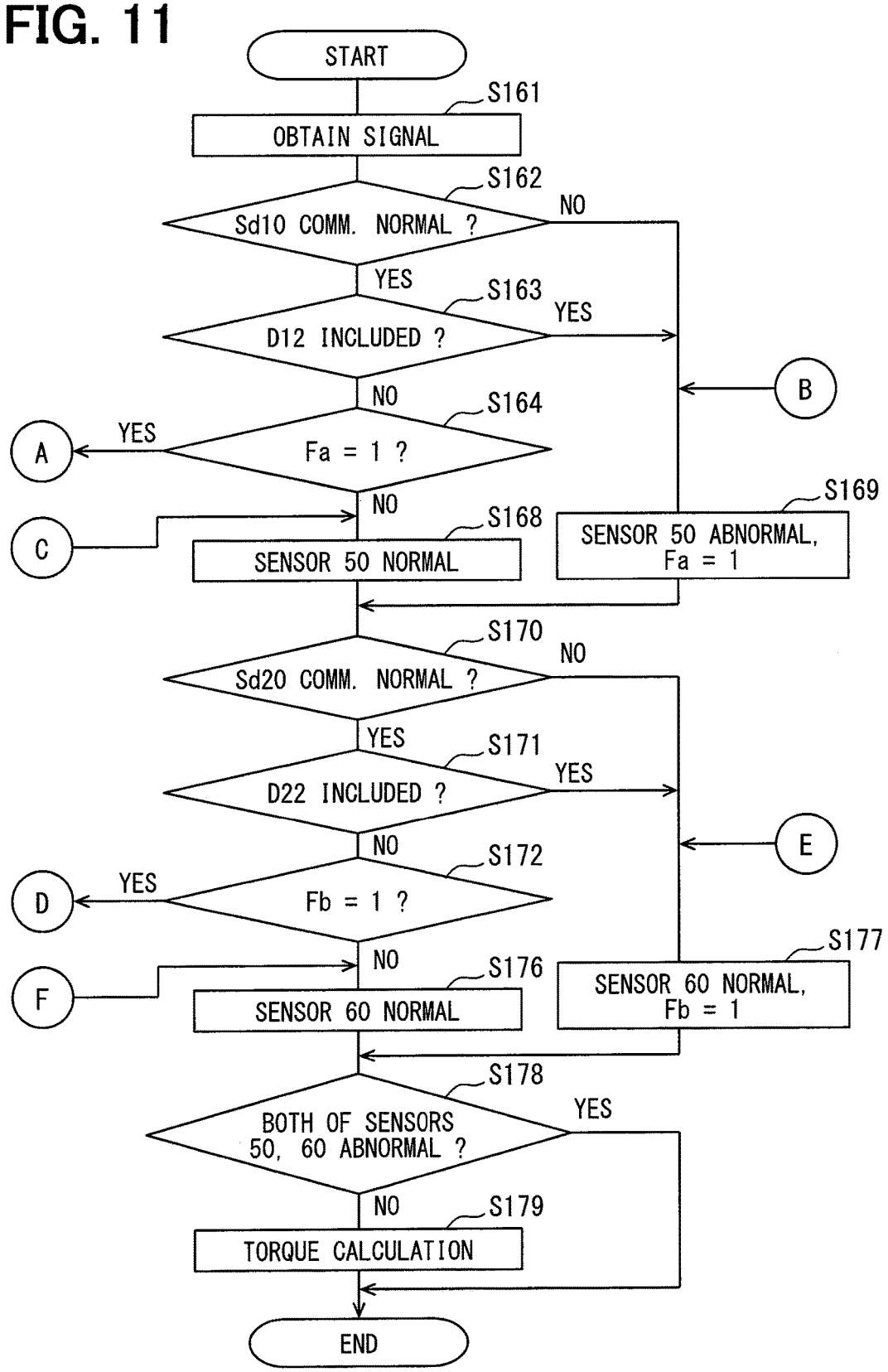
FIG. 11 is a first flowchart of a process in an ECU in a third embodiment of the present disclosure.
Figure 12:
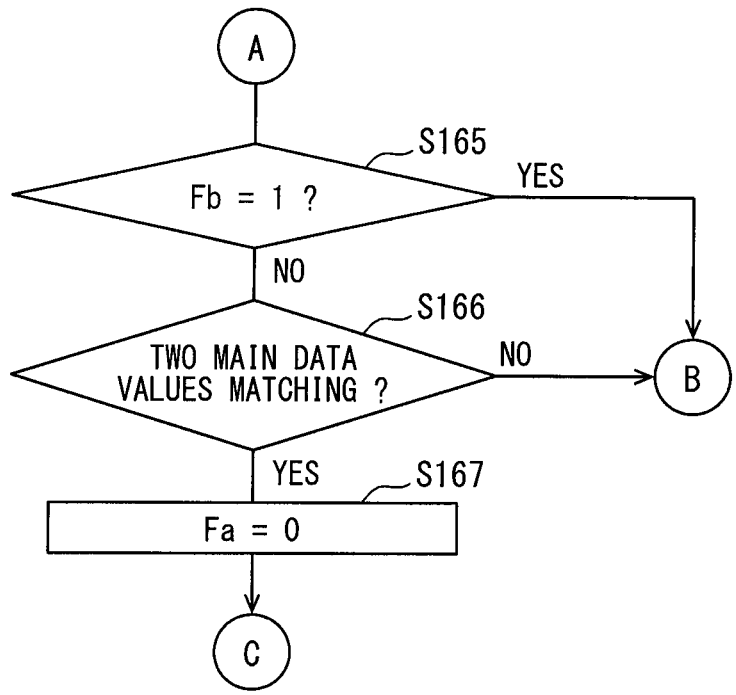
FIG. 12 is a second flowchart of a process in the ECU in the third embodiment of the present disclosure.
Figure 13:
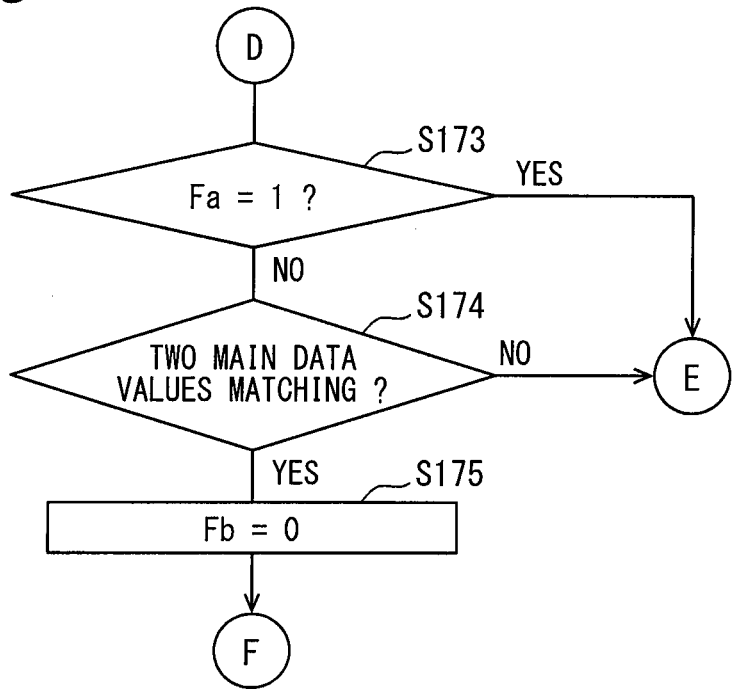
FIG. 13 is a third flowchart of a process in the ECU in the third embodiment of the present disclosure.

The third embodiment of the present disclosure is shown in FIGS. 11-13. In the third embodiment, the process in the interface circuits 555 and 655 is the same as that of the first embodiment, and the abnormality determination process in the ECU 85 is different from the first embodiment. Hereafter, the abnormality determination process is described with reference to a flowchart shown in FIGS. 11-13.

The process of each of S161-S163 in FIG. 11 is the same as the process of each of S121-S123 in FIG. 9. When a negative determination is performed in S162, and when the affirmation determination is performed in S163, the process proceeds to S169.

In S164, the abnormality determiner 855 determines whether a first abnormality determination flag Fa is set (i.e., Fa=1), which indicates that the first magnetic sensor 50 is determined as abnormal.

When it is determined that the first abnormality determination flag Fa is set (S164:YES), the process proceeds to S165 of FIG. 12.

When it is determined that the first abnormality determination flag Fa is not set (i.e., Fa=0) (S164:NO), the process proceeds to S168.

In S165, the abnormality determiner 855 determines whether a second abnormality determination flag Fb is set (i.e., Fb=1), which indicates that the second magnetic sensor 60 is determined as abnormal.

When it is determined that the second abnormality determination flag Fb is set (S165:YES), the process proceeds to S169 of FIG. 11.

When it is determined that the second abnormality determination flag Fb is not set (i.e., Fb=0) (S165:NO), the process proceeds to S166.

In S166, the abnormality determiner 855 determines whether (a) the main data value indicated by the first main signal D11 of the first output signal Sd10 that is transmitted from the first magnetic sensor 50 and (b) the main data value indicated by the second main signal D21 of the second output signal Sd20 that is transmitted from the second magnetic sensor 60 are matching.

When it is determined that the two main data values are matching (S166:YES), the process proceeds to S167.

When it is determined that the two main data values are mismatched (S166:NO), the process proceeds to S169 of FIG. 11.

In S167, the abnormality determiner 855 resets the first abnormality determination flag Fa noting that the first magnetic sensor 50 has recovered from an abnormal state (i.e., Fa=0). The process proceeds to S168 of FIG. 11 after S167.

Returning the description to FIG. 11, in S168, and the abnormality determiner 855 determines that the first magnetic sensor 50 is normal. The process proceeds to S170 after S168.

In S169, the abnormality determiner 855 determines that the first magnetic sensor 50 is abnormal, and the first abnormality determination flag Fa is set (i.e., Fa=1). The process proceeds to S170 after S169.

The process of each of S170-S171 is the same as the process of each of S126-S127 in FIG. 9. When a negative determination is performed bin S170, and when an affirmation determination is performed in S171, the process proceeds to S177.

In S172, the abnormality determiner 855 determines whether the second abnormality determination flag Fb is set (i.e., Fb=1). When it is determined that the second abnormality determination flag Fb is set (S172:YES), the process proceeds to S173 of FIG. 13. When it is determined that the second abnormality determination flag Fb is not set (i.e., Fb=0) (S172:NO), the process proceeds to S176.

In S173 of FIG. 13, the abnormality determiner 855 determines whether the first abnormality determination flag Fa is set. When it is determined that the first abnormality determination flag Fa is set (i.e., Fa=1) (S173:YES), the process proceeds to S177 of FIG. 11. When it is determined that the first abnormality determination flag Fa is not set (i.e., Fa=0) (S173:NO), the process proceeds to S174.

In S174, the abnormality determiner 855 determines whether (a) the main data value indicated by the first main signal D11 of the first output signal Sd10 that is transmitted from the first magnetic sensor 50 and (b) the main data value indicated by the second main signal D21 of the second output signal Sd20 that is transmitted from the second magnetic sensor 60 are matching.

When it is determined that the two main data values are matching (S174:YES), the process proceeds to S175.

When it is determined that the two main data values are mismatched (S175:NO), the process proceeds to S177 of FIG. 11.

In S175, the abnormality determiner 855 resets the second abnormality determination flag Fb noting that the second magnetic sensor 60 has recovered from an abnormal state (i.e., Fb=0). The process proceeds to S176 of FIG. 11 after S175.

Returning the description to FIG. 11, in S176, the abnormality determiner 855 determines that the second magnetic sensor 60 is normal. The process proceeds to S178 after S176.

In S177, it is determined that the abnormality determiner 855 determines that the second magnetic sensor 60 is abnormal, and the second abnormality determination flag Fb is set (i.e., Fb=1). The process proceeds to S178 after S177.

The process of each of S178-S179 is the same as the process of each of S130-S131 in FIG. 9.

In the third embodiment as described above, the abnormality determiner 855 determines that, when (a) the first magnetic sensor 50 is determined as abnormal, (b) the first sub signal D12 is not included in the first output signal Sd10 that is transmitted from the first magnetic sensor 50, (c) the second magnetic sensor 60 is not determined as abnormal, and (d) the main data value indicated by the first main signal D11 of the first output signal Sd10 that is transmitted from the first magnetic sensor 50, and the main data value indicated by the second main signal D21 of the second output signal Sd20 that is transmitted from the second magnetic sensor 60 are matching, the first magnetic sensor 50 has recovered from an abnormal state, and is now normal.

In such manner, it is determinable that the first magnetic sensor 50 is normal, after recovery from an abnormal state.

Further, the abnormality determiner 855 determines that, when (a) the second magnetic sensor 60 is determined as abnormal, (b) the second sub signal D22 is not included in the second output signal Sd20 that is transmitted from the second magnetic sensor 60, (c) the first magnetic sensor 50 is not determined as abnormal, and (d) the main data value indicated by the first main signal D11 of the first output signal Sd10 that is transmitted from the first magnetic sensor 50, and the main data value indicated by the second main signal D21 of the second output signal Sd20 that is transmitted from the second magnetic sensor 60 are matching, the second magnetic sensor 60 has recovered from an abnormal state, and is now normal.

In such manner, it is determinable that the second magnetic sensor 60 is normal after recovery from an abnormal state.

Fourth Embodiment

Figure 14:
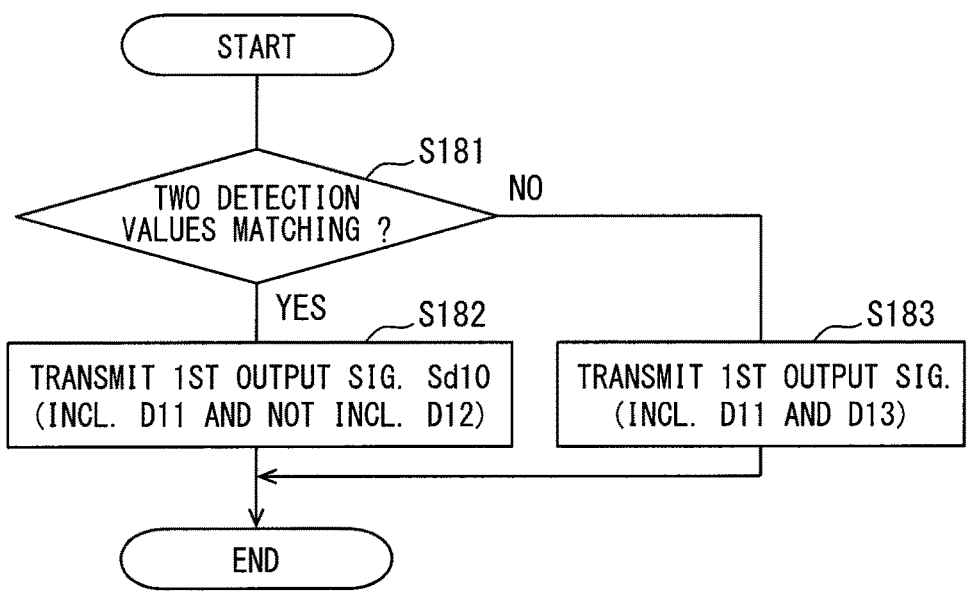
FIG. 14 is a flowchart of a process in the interface circuit of the first magnetic sensor in a fourth embodiment of the present disclosure.
Figure 15:
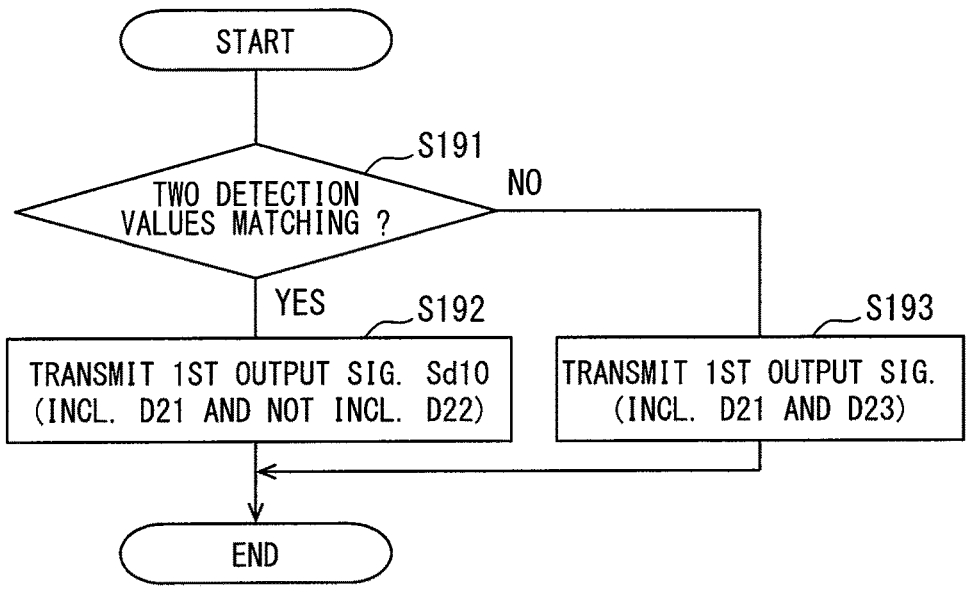
FIG. 15 is a flowchart of a process in the interface circuit of the second magnetic sensor in the fourth embodiment of the present disclosure.
Figure 16:
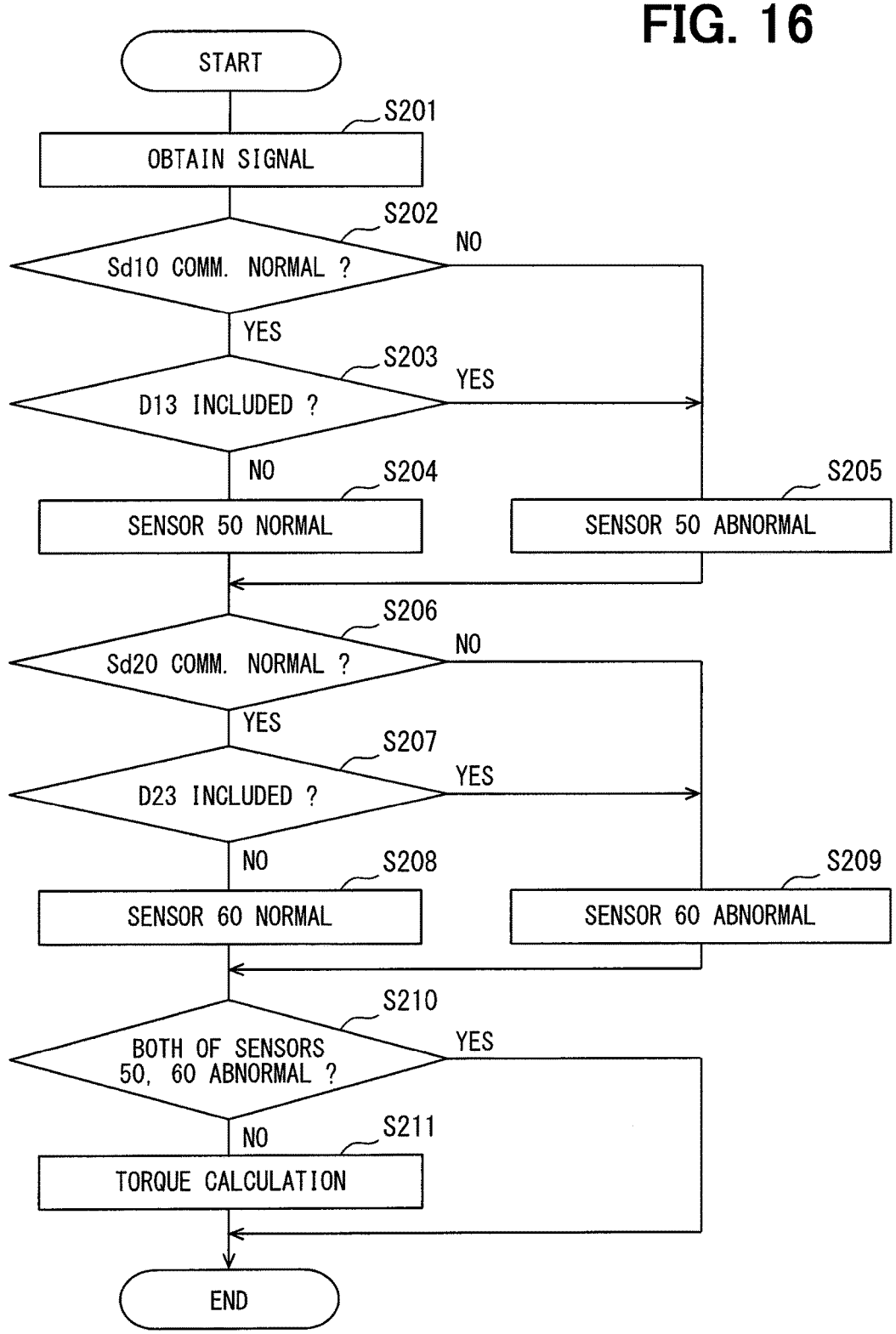
FIG. 16 is a flowchart of a process in the ECU in the fourth embodiment of the present disclosure.

The fourth embodiment of the present disclosure is shown in FIGS. 14-16. In the fourth embodiment, the process in the interface circuits 555 and 655 and the abnormality determination process in the ECU 85 are both different from the first embodiment. Hereafter, each process is described with reference to flowcharts shown in FIGS. 14-16.

The process of FIG. 14 of S181-S182 is the same as the process of FIG. 7 of S101-S102.

In S183, the signal transmitter 557 generates and transmits the first output signal Sd10 including the first main signal D11 and a first flag signal D13. The first flag signal D13 is a signal which shows that the first main detection value and the first sub detection value are mismatched. In order to distinguish the first flag signal D13 from other signals, the pulse length of the first flag signal D13 is set up to be different from the pulse length of other signals, for example.

The process of each of S191-S192 in FIG. 15 is the same as the process of each of S111-S112 in FIG. 8.

In S193, the signal transmitter 657 generates and transmits the second output signal Sd20 including the second main signal D21 and a second flag signal D23. The second flag signal D23 is a signal which shows that the second main detection value and the second sub detection value are mismatched. In order to distinguish the second flag signal D23 from other signals, the pulse length of the second flag signal D23 is set up to be different from the pulse length of other signals, for example.

The process of each of S201 and S202 in FIG. 16 is the same as the process of each of S121 and S122 in FIG. 9.

In S203, the abnormality determiner 855 determines whether the first flag signal D13 is included in the first output signal Sd10. When it is determined that the first flag signal D13 is included in the first output signal Sd10 (S203:YES), the process proceeds to S205. When it is determined that the first flag signal D13 is not included in the first output signal Sd10 (S203:NO), the process proceeds to S204.

The process of each of S204-S206 is the same as the process of each of S124-S126 in FIG. 9.

In S207, the abnormality determiner 855 determines whether the second flag signal D23 is included in the second output signal Sd20. When it is determined that the second flag signal D23 is included in the second output signal Sd20 (S207:YES), the process proceeds to S209. When it is determined that the second flag signal D23 is not included in the second output signal Sd20 (S207:NO), the process proceeds to S208.

The process of each of S208-S211 is the same as the process of each of S128-S131 in FIG. 9.

In the fourth embodiment described above, the ECU 85 may determine the abnormality of the magnetic sensors 50 and 60 based on whether the flag signals D13 and D23 exist, i.e., included, in the signals Sd10, Sd20.

Further, the flag signals D13 and D23 can make the data size smaller than the sub signals D12 and D22. Therefore, when transmitting the flag signals D13 and D23 as described in the fourth embodiment, the transmission time of the output signals Sd10 and Sd20 is reduced in comparison to the first embodiment that transmits the sub signals D12 and D22.

Fifth Embodiment

Figure 17:
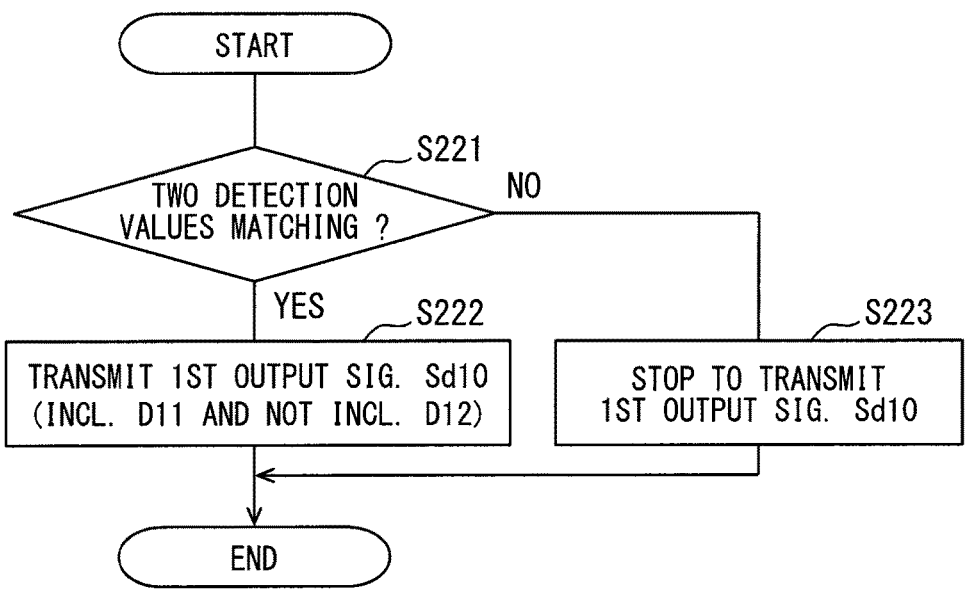
FIG. 17 is a flowchart of a process in the interface circuit of the first magnetic sensor in a fifth embodiment of the present disclosure.
Figure 18:
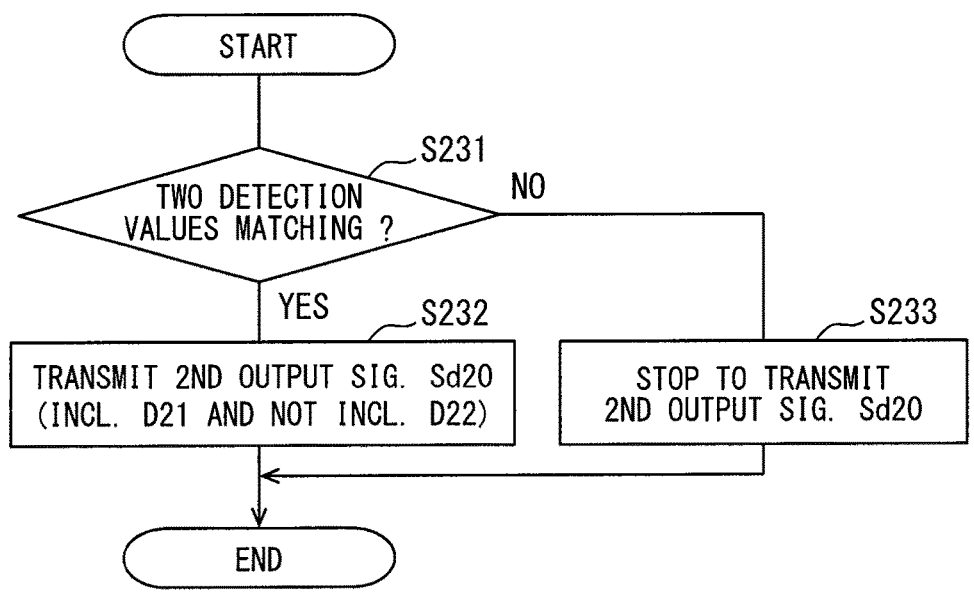
FIG. 18 is a flowchart of a process in the interface circuit of the second magnetic sensor in the fifth embodiment of the present disclosure.
Figure 19:
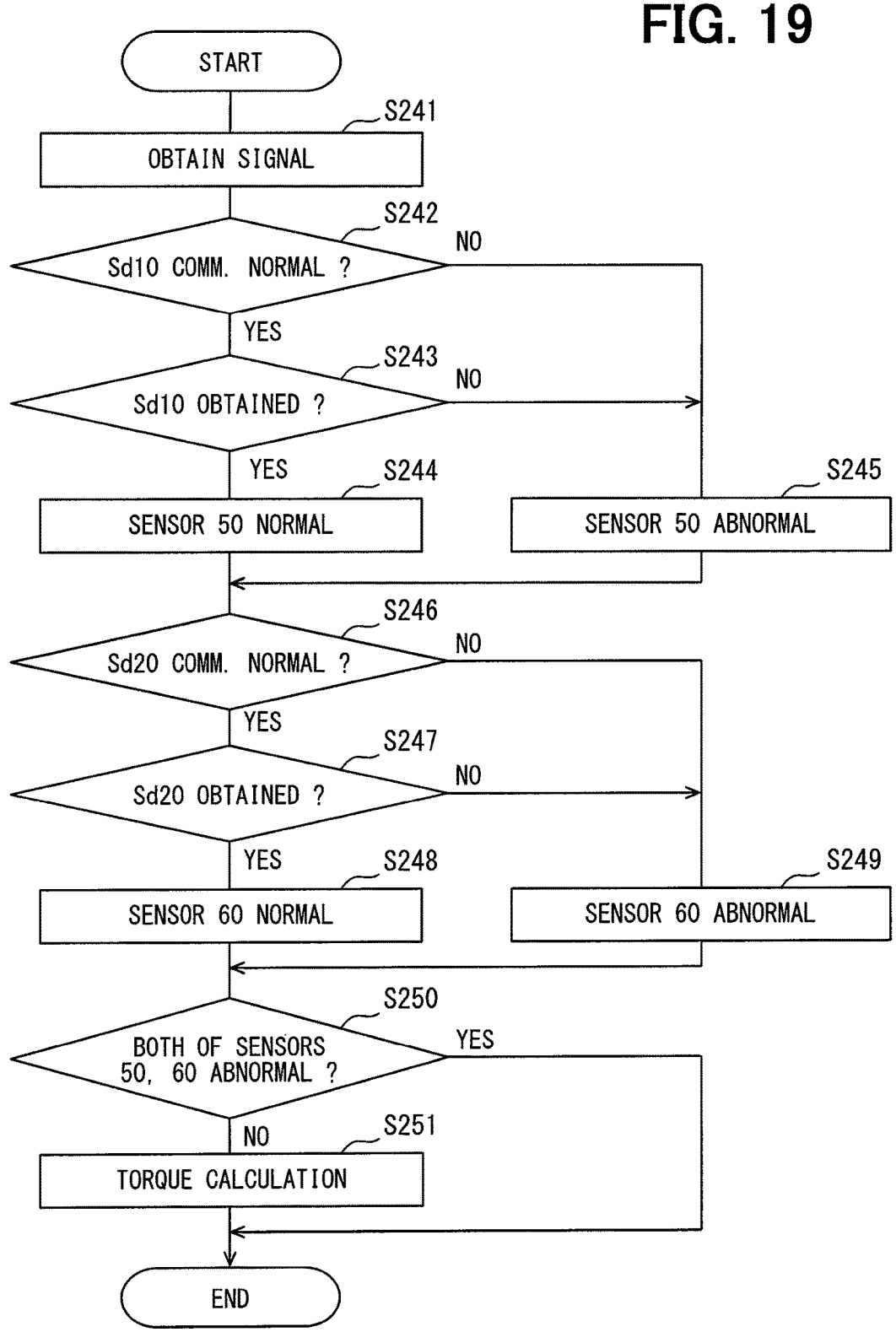
FIG. 19 is a flowchart of a process in the ECU in the fifth embodiment of the present disclosure.

The fifth embodiment of the present disclosure is shown in FIGS. 17-19. In the fifth embodiment, the process in the interface circuits 555 and 655 and the abnormality determination process in the ECU 85 are both different from the first embodiment. Hereafter, each process is described with reference to flowcharts in FIGS. 17-19.

The process of each of S221-S222 in FIG. 17 is the same as the process of each of S101-S102 in FIG. 7.

In S223, the signal transmitter 557 does not transmit the first output signal Sd10. That is, transmission of the first output signal Sd10 is stopped.

The process of each of S231-S232 in FIG. 18 is the same as the process of each of S111-S112 in FIG. 8.

In S233, the signal transmitter 657 does not transmit the second output signal Sd20. That is, transmission of the second output signal Sd20 is stopped.

The process of each of S241 and S242 in FIG. 19 is the same as the process of each of S121 and S122 in FIG. 9.

In S243, the abnormality determiner 855 determines whether the first output signal Sd10 has been obtained. When it is determined that the first output signal Sd10 has been obtained (S243:YES), the process proceeds to S244. When it is determined that the first output signal Sd10 has not been obtained (S243:NO), the process proceeds to S245.

The process of each of S244-S246 is the same as the process of each of S124-S126 in FIG. 9.

In S247, the abnormality determiner 855 determines whether the second output signal Sd20 has been obtained. When it is determined that the second output signal Sd20 has been obtained (S247:YES), the process proceeds to S248. When it is determined that the second output signal Sd20 has not been obtained (S247:NO), the process proceeds to S249.

The process of each of S248-S251 is the same as the process of each of S128-S131 in FIG. 9.

In the fifth embodiment signal as described above, the signal transmitters 557 and 657 stops transmission of the output signals Sd10 and Sd20 when the main detection value and the sub detection value are not matching, i.e., when the abnormality of the sensor element is suspected, and the ECU 85 may determine the abnormality of the magnetic sensors 50 and 60 based on whether the output signals Sd10 and Sd20 have been obtained.

Other Embodiments

In other embodiments, while the abnormality of the magnetic sensor may be determined based on the existence of the flag signal as described in the fourth embodiment, the recovery of the magnetic sensor from the abnormal state may be determined at the same time as described in the third embodiment.

That is, the abnormality determiner may determine that one magnetic sensor is now normal after recovery from an abnormal state, when (a) it is determined that one magnetic sensor is abnormal, and (b) the flag signal is not included in the output signal that is transmitted from the one magnetic sensor, and (c) it is not determined that the other magnetic sensor is abnormal, and (d) the data value indicated by the main signal of the output signal that is transmitted from the one magnetic sensor and the data value indicated by the main signal of the output signal that is transmitted from the other magnetic sensor are matching.

In other embodiments, while the abnormality of the magnetic sensor may be determined based on whether the output signal has been obtained as described in the fifth embodiment, the recovery of the magnetic sensor from the abnormal state may be determined at the same time as described in the third embodiment.

That is, the abnormality determiner may determine that one magnetic sensor is now normal after recovery from an abnormal state, when (a) it is determined that one magnetic sensor is abnormal, (b) the signal obtainer obtains the output signal from the one magnetic sensor, (c) it is not determined that the other magnetic sensor is abnormal, and (d) the data value indicated by the main signal of the output signal that is transmitted from the one magnetic sensor, and the data value indicated by the main signal of the output signal that is transmitted from the other magnetic sensor are matching.

The communication error detection signal implemented as the CRC signal in the above-mentioned embodiments may also be implemented in other embodiments as any signal other than the CRC signal, as long as the signal is usable for detecting the communication error in the controller. Further, the output signal does not need to include the communication error detection signal.

Further, in other embodiments, the output signal may include information on an update counter which is updated every time the output signal is transmitted. The information regarding the update counter may be, for example, included in the status signal. By transmitting the information regarding the update counter, it is determinable whether the same data transmitted twice is caused by (a) the two same detection results or (b) due to a data adhesion error.

The first main signal, the first sub signal, the second main signal, and the second sub signal represented by the nibble in the above-mentioned embodiments may also be represented by any form other than the nibble in other embodiments.

The output signal transmitted to the controller by the SENT communication method in the above-mentioned embodiments may also be transmitted to the controller by any method other than the SENT method, as long as the communication method is capable of including, in the output signal, the data signals respectively corresponding to the plural detection values.

In other embodiments, the first output signal and the second output signal may be simultaneously transmitted or may be transmitted one by one, i.e., at the same transmission timing or at the different transmission timings. For example, the transmission timing of the first output signal may be shifted by half signal cycle from the transmission timing of the second output signal, thereby enabling the controller to receive the output signals at every half signal cycle, which improves the communication speed in appearance.

The sensor element implemented as the Hall element in the above-mentioned embodiments may also be implemented in other embodiments as any magnetism detecting elements other than the Hall element, or may also be implemented as the elements which detect a change of physical quantity other than magnetism.

The sensor section serving as a torque sensor detecting a steering torque in the above-mentioned embodiments, may also be serving as a sensor other than the torque sensor, e.g., a pressure sensor detecting a pressure in other embodiments, for example. That is, the physical quantity calculated in the calculator may be a torque other than the steering torque, and may be a physical quantity other than the torque in other embodiments.

The sensing object described as the magnetic flux collection module in the above-mentioned embodiments may also be any matter other than the magnetic flux collection module in other embodiments.

The controller performing the abnormality determination of the second magnetic sensor after the abnormality determination of the first magnetic sensor in the above-mentioned embodiment may also perform, in other embodiments, the abnormality determination of the first magnetic sensor after the abnormality determination of the second magnetic sensor, or the abnormality determination of two or more magnetic sensors may be performed in parallel.

The sensor device applied to the electric power steering apparatus in the above-mentioned embodiments may also be applied to other in-vehicle devices other than the electric power steering apparatus in other embodiments, or may also be applied to other devices which are not disposed in a vehicle.

Although the present disclosure has been described in connection with preferred embodiment thereof with reference to the accompanying drawings, it is to be noted that various changes and modifications will become apparent to those skilled in the art, and such changes, modifications, and summarized scheme are to be understood as is within the scope of the present disclosure as defined by appended claims.

What is claimed is:
1. A sensor device comprising:
one or more sensor sections, each sensor section including:
   a main detector and a sub detector configured to respectively detect an amount from a detection object;
   a signal comparator configured to compare a main detection value from the main detector and a sub detection value from the sub detector;
   a signal transmitter configured to generate and to transmit an output signal that includes
      a main signal corresponding to the main detection value without including a sub signal corresponding to the sub detection value, in response to the main detection value and the sub detection value matching, and
      the main signal and the sub signal, in response to the main detection value and the sub detection value being mismatched; and
a controller including:
   a signal obtainer configured to obtain the output signal;
   a calculator configured to perform a calculation based on the output signal obtained by the signal obtainer; and
   an abnormality determiner configured to determine the sensor section that transmits the output signal is abnormal, in response to the output signal obtained by the signal obtainer including the main signal and the sub signal.

2. The sensor device of claim 1, wherein
the abnormality determiner is further configured to determine the sensor section that transmits the output signal is normal, in response to the output signal obtained by the signal obtainer including no sub signal.

3. The sensor device of claim 2, wherein
the calculator is further configured to perform the calculation based on the output signal transmitted from the sensor section determined as normal by the abnormality determiner.

4. The sensor device of claim 1, wherein
the sensor device includes two sensor sections, and wherein the abnormality determiner is further configured to determine that
   (A) one of the two sensor sections is normal, in response to (i) the one of the two sensor sections not being determined as abnormal, and (ii) the output signal transmitted from the one of the sensor sections including no sub signal, and
   (B) the one of the two sensor sections being normal, after recovery from an abnormal state, in response to
      (a) the one of the two sensor sections being determined as abnormal, (b) the output signal transmitted from the one of the two sensor sections including no sub signal, (c) another one of the two sensor sections not being determined as abnormal, and (d) a data value of the main signal in the output signal transmitted from the one of the two sensor sections matching a data value of the main signal in the output signal transmitted from the other one of the two sensor sections.

5. A sensor device comprising:
one or more sensor sections, each sensor section including:
a main detector and a sub detector configured to respectively detect an amount from a detection object;
a signal comparator configured to compare a main detection value from the main detector and a sub detection value from the sub detector;
a signal transmitter configured to generate and to transmit an output signal that includes
a main signal corresponding to the main detection value without including a sub signal corresponding to the sub detection value, in response to the main detection value and the sub detection value matching, and
a flag signal indicative of the mismatch of the main detection value and the sub detection value, in response to the main detection value and the sub detection value being mismatched; and
a controller including:
a signal obtainer configured to obtain the output signal;
a calculator configured to perform a calculation based on the output signal obtained by the signal obtainer; and
an abnormality determiner configured to determine that the sensor section that transmits the output signal is abnormal, in response to the output signal obtained by the signal obtainer including the main signal and the flag signal.

6. The sensor device of claim 5, wherein
the abnormality determiner is further configured to determine the sensor section that transmits the output signal is normal, in response to the output signal obtained by signal obtainer including no flag signal.

7. The sensor device of claim 5, wherein
the sensor device includes two sensor sections, and wherein the abnormality determiner is further configured to determine that
(A) one of the two sensor sections is normal, in response to (i) the one of the two sensor sections not being determined as abnormal, and (ii) the output signal transmitted from the one of the sensor sections including no flag signal, and
(B) the one of the two sensor sections is normal after recovery from an abnormal state, in response to
(a) the one of the two sensor sections being determined as abnormal,
(b) the output signal transmitted from the one of the two sensor sections including no flag signal,
(c) another one of the two sensor sections not being determined as abnormal, and
(d) a data value of the main signal in the output signal transmitted from the one of the two sensor sections matching data value of the main signal in the output signal transmitted from the other one of the two sensor sections.

8. A sensor device comprising:
one or more sensor sections, each sensor section including:
a main detector and a sub detector configured to respectively detect an amount from a detection object;
a signal comparator configured to compare a main detection value from the main detector and a sub detection value from the sub detector;
a signal transmitter configured to generate and to transmit an output signal that includes a main signal corresponding to the main detection value
without including a sub signal corresponding to the sub detection value, in response to the main detection value and the sub detection value matching, wherein the signal transmitter is further configured to stop transmitting the output signal and not transmit an abnormal detection signal, in response to the main detection value and the sub detection value being mismatched; and
a controller including:
a signal obtainer configured to obtain the output signal;
a calculator configured to perform a calculation based on the output signal obtained by the signal obtainer; and
an abnormality determiner configured to determine that the sensor section expected to transmit the output signal is abnormal, in response to the signal obtainer obtaining no output signal.

9. The sensor device of claim 8, wherein
the abnormality determiner is further configured to determine the sensor section is normal, in response to the signal obtainer obtaining the output signal.

10. The sensor device of claim 8, wherein
the sensor device includes two sensor sections, and wherein the abnormality determiner is further configured to determine that
(A) one of the two sensor sections is normal in response to (i) the one of the two sensor sections not being determined as abnormal, and (ii) the output signal transmitted from the one of the sensor sections being obtained by the signal obtainer, and
(B) the one of the two sensor sections is normal, after recovery from an abnormal state, in response to
(a) the one of the two sensor sections being determined as abnormal,
(b) the output signal transmitted from the one of the two sensor sections being obtained by the signal obtainer,
(c) another one of the two sensor sections not being determined as abnormal, and
(d) a data value of the main signal in the output signal transmitted from the one of the two sensor sections matching a data value of the main signal in the output signal transmitted from the other one of the two sensor sections.

* * * * *